United States Patent [19]

Weber et al.

[11] Patent Number: 4,544,451
[45] Date of Patent: Oct. 1, 1985

[54] APPARATUS WITH TWO-STAGE HEATING FOR CARBONIZING COLD-COMPACTED BRIQUETTES

[75] Inventors: Heinrich Weber, Recklinghausen; Kurt Lorenz, Hattingen; Horst Dungs, Herne, all of Fed. Rep. of Germany

[73] Assignee: Firma Carl Still GmbH & Co. KG, Fed. Rep. of Germany

[21] Appl. No.: 580,794

[22] Filed: Feb. 16, 1984

Related U.S. Application Data

[62] Division of Ser. No. 458,278, Jan. 17, 1983.

[30] Foreign Application Priority Data

Jan. 23, 1982 [DE] Fed. Rep. of Germany ....... 3202161

[51] Int. Cl.$^4$ ............................ C10B 1/04; C10B 3/02
[52] U.S. Cl. .................................... 202/114; 202/124; 202/126; 202/221; 202/270
[58] Field of Search ......................... 201/6-8, 201/15, 20, 27, 29, 34, 39, 43, 44; 202/114, 124, 126, 221, 270

[56] References Cited

U.S. PATENT DOCUMENTS

| | | | |
|---|---|---|---|
| 3,316,155 | 4/1967 | Holowaty et al. | 201/34 |
| 4,050,990 | 9/1977 | Lorenz | 201/6 |
| 4,097,245 | 6/1978 | Holowaty | 201/6 |
| 4,134,794 | 1/1979 | Lorenz et al. | 201/34 |
| 4,248,670 | 2/1981 | Lorenz et al. | 201/6 |
| 4,259,157 | 3/1981 | Lorenz et al. | 201/6 |
| 4,260,458 | 4/1981 | Weber et al. | 202/126 |
| 4,342,622 | 8/1982 | Holowaty | 201/6 |
| 4,385,962 | 5/1983 | Stewen et al. | 201/6 |

FOREIGN PATENT DOCUMENTS

| | | | |
|---|---|---|---|
| 2556776 | 7/1976 | Fed. Rep. of Germany | 201/6 |
| 2756330 | 6/1979 | Fed. Rep. of Germany | . |
| 0136851 | 8/1979 | Fed. Rep. of Germany | 201/6 |
| 0154613 | 4/1982 | Fed. Rep. of Germany | 201/6 |

Primary Examiner—Peter Kratz
Attorney, Agent, or Firm—McGlew and Tuttle

[57] ABSTRACT

Briquettes made from bituminous or sub-bituminous coal or peat are produced by grinding the coal, mixing it with a binder and compacting the mixture. They are then carbonized in a continuous process in a shaft oven. The coal may be predried and the finished briquettes may be preheated, with a subsequent drying and hardening. The carbonization is effected in two stages in an indirectly heated shaft oven, with the evolved gas being taken off about at the mid-height of the oven shaft, processed, and used for heating in the second, high-temperature stage. The flue gases from this high-temperature stage are used for heating in the first stage and for preheating. The second or high-temperature stage is followed by a cooling stage where the gases evolved in the second stage, and mainly comprising hydrogen are used and circulated. The evolved gas in excess is continuously removed from the cooling circuit.

2 Claims, 2 Drawing Figures

APPARATUS WITH TWO-STAGE HEATING FOR CARBONIZING COLD-COMPACTED BRIQUETTES

This is a division of application Ser. No. 458,278, filed Jan. 17, 1983.

FIELD AND BACKGROUND OF THE INVENTION

This invention relates in general to coking and in particular to a new and useful apparatus for carbonizing cold-compacted briquettes.

Such methods are known in the art and also practiced on larger scales (see for example, "Eisen und Stahl (Iron and Steel)" No. 93, 1973, Page 24).

Pitch, tar, mineral oil residues, or even sulfite liquor from the cellulose industry, for example, are employed as the binder. The sulfite liquor is obtained during the wood pulping process where particularly calcium bisulfite is the reactant, and the liquor contains about 50% of solid matter. Which binder to use depends on the nature of coal to be briquetted and coked. For example, "enriching" binders will be admixed to lean coals, while "leaning" binders will be added to average and well caking coals. Enriching binders are pitch and tar, for example, and sulfite liquor is often employed as a leaning binder. Occasionally, however, it is advantageous to admix pitch and sulfite liquor at the same time.

In the prior art, such briquettes are carbonized in either a discontinuous or a continuous process. With a discontinuous carbonization, indirect heating may be provided and rich gas can be obtained. A difficulty arises, however, in that the individual briquettes adhere to each other and form large agglomerates instead of separate pieces, which entails considerable problems in the coke removal.

In a continuous carbonization, direct heating with hot gases is provided and the substances obtained from the briquettes during the coking process are partly combusted. The risk of agglomeration is reduced, but not excluded, and only a gas of relatively low calorific value is obtained. Another drawback is that the hot flue gases having a temperature of 1,000° C. have a steam content of about 10% by volume, causing a gasification of a considerable proportion of the coke (2 to 4%), in the high-temperature portion of the coking shaft.

In a discontinuous coking process, the throughput, referred to a unit volume of the oven, approximately corresponds to that in a conventional chamber coking operation. The higher a throughput in a continuous coking process, however, as already mentioned, is redeemed by obtaining a gas of lower calorific value and by high losses on a fixed carbon due to gasification reactions.

Further, in prior art discontinuous processes, only a compound degasification gas is obtained containing both the hydrocarbons of high calorific value produced at the low or medium coking temperature, and the total of the hydrogen liberated from the semicoke during the high-temperature carbonization. That is why no specific or differentiated use of the evolved gases is possible in the prior art methods. It is advisable to recycle these gases into the process again.

SUMMARY OF THE INVENTION

The present invention is directed to an apparatus which is applicable to a variety of coal grades, and makes it possible to increase the throughput per unit volume of the coke oven and to obtain rich gas from the carbonization. At the same time, it is sought to make a process using the apparatus continuous, to improve the energy economy in the coking operation, and to reduce the environmental pollution.

In accordance with the invention, both bituminous and sub-bituminous coal or peat is carbonized by grinding it to form a ground material which is mixed in a binder such as a sulfite liquor or a mixture of this liquor with tar and pitch or similar mineral residues, compacting and pressing the mixture to form briquettes, preheating the briquettes and subsequently drying and hardening the briquettes. Thereupon the briquettes are carbonized in a shaft oven and they are hardened in a continuously operating heater and charged into a continuously operating indirectly heated coking shaft where in the first stage spanning about half the height of the shaft a substantial part of their volatility matter is expelled at a medium temperature and in a second stage a degasification at a high temperature takes place. Subsequently, the briquettes are cooled. Advantageously the gas is evolved in a first coking stage and removed in the direction of the positive temperature gradient at about half the height of the coking oven shaft.

The gas rich in hydrogen coming from the second coking stage might also be taken off at this location; however, to ensure economy in the use of the mainly hydrogen containing gases from the second coking stage, it appears preferable to remove these gases separately at the cooling stage.

The hydrogen-rich gases of the high temperature stage are used as cooling gases and they are circulated through the cooling stage. The gases evolved in the first coking stage are advantageously recycled for the shaft oven heating. The gases from the first coking stage and containing tar may be taken off at half the furnace height where they have a temperature of about 280° to 350° C. In comparison therewith, it may be noted that in a conventional chamber coking process, these gases are taken off with temperatures of 900° to 1000° C. A much lesser amount of heat is thus removed from the system with the inventive method, which means that the total heat needed for carbonization is reduced and the energy balance is improved.

At half the height of the shaft oven, the temperature of the mass of coke amounts to about 480° to 550° C. Hence, substantially, the evolved gases do not crack. Consequently, no cracking heat is consumed.

The method of using the apparatus may be carried out, for example, as follows: The fine coal is predried at 100° to 120° C. to a moisture content of 1 to 3% and then cooled to 60° to 70° C. After mixing with sulfite liquor from the cellulose industry as a binder in an amount of 5 to 8% by weight of the fine coal, the mixture having a moisture content of 4 to 8% is briquetted and the briquettes are discharged from the presses with a temperature of 50° to 60° C.

The drying and preheating of the briquettes is effected preferably with the flue gases of the first coking stage, at temperatures between 180° and 300° C. This means that the heat of the flue gases is utilized to a very high degree. The period of dwell in the dryer or heater is 30 to 60 minutes. The obtained exit temperature of the briquettes is then 150° to 220° C. With this preheating of the briquettes to 150° to 220° C., the sulfite liquor carbonizes and gives off most of its volatile matter. Thereby, a coke skeleton forms of the sulfite liquor before the coal becomes plasticized, which considerably reduces the swelling of the forms and increases the strength of the briquettes. The addition of sulfite liquor thus counteracts a plastic deformation of the briquettes in the critical temperature region.

Prior to entering the coking shaft, the preheated briquettes lose about 10° C. and are therefore introduced with a temperature of 140° to 210° C. With a migration speed of about 0.8 meters per hour they reach a temperature of 480° to 550° C. at the mid-level of the shaft in the shaft center, or a temperature up to 630° C. in the peripheral zones. At these temperatures the briquettes still contain about 6 to 8% of volatile matter. As already mentioned above, the crude gas evolving during the low-temperature carbonization is evacuated with a temperature of 280° to 350° C. at the mid-level of the shaft. This shaft portion is heated with the waste gases from the heating of the lower shaft portion, which have a temperature of 700° to 1000° C. As mentioned above, these gases then leave the first coking stage, which may also be termed low-temperature coking stage, with a temperature of 180° to 300° C. and are directed to the dryer or preheater for the briquettes where they serve the purpose of drying, preheating, or subsequently hardening the finished briquettes.

With the preferred overall height of the coking shaft, a period of dwell in the low-temperature shaft portion of 5 to 8 hours is obtained. In the high-temperature shaft portion the carbonization takes place at temperatures up to 1000° C. This portion is heated indirectly by means of a system of stepwise heating of conventional design, by combusting the gases which were evolved in the low-temperature coking portion and purified. The waste gases of this combustion in the high temperature portion reach the first stage, where the carbonization takes place at a medium temperature, with a temperature between 700° and 1000° C., as mentioned above. An additional heating with combustible gases for the first coking stage might be advisable under proper conditions. The high-temperature stage representing the second coking stage is followed by a cooling stage where the briquettes are cooled from about 1000° C. to 50° to 150° C. This is effected by means of directly acting cooling gases which are circulated and are taken from the gases evolved in the high-temperature stage. The heat absorbed by the cooling gases is then used in a waste heat boiler for generating steam.

Belt-type driers have proved particularly suitable for the drying, preheating, and subsequent hardening of the briquettes. The belts are driven at speeds of 80 to 150 mm per minute, preferably 100 mm per minute.

In accordance with the invention, the shaft portion embodying the first, i.e. low-temperature, coking stage is made of a metallic material. This ensures a large heat transfer from flue gases to the briquettes and considerably reduces the capital investment. The first coking stage is followed by the second or high-temperature stage embodied by the shaft portion of ceramic material. This portion is heated by means of an indirect stepwise system of conventional design.

The total constructional height of the low-temperature shaft portion is usually 4 to 7 meters, that of the high-temperature portion 3 to 5 meters.

The apparatus terminates by a discharge system provided below the cooling stage and comprising, for example, a scraper conveyor by which the briquettes are transported to a lock, wherefrom they pass to the free atmosphere.

The equipment described in the foregoing may also conveniently be employed if the plant is designed as a battery. In such a case, the individual coking sections might have the following dimensions:

Length about 10 meters
Chamber width about 400 mm
Height of the low-temperature portion about 5 meters
Height of the high-temperature portion about 3.5 to 4 meters
Cooling stage about 2.5 meters
Total height of the oven about 16 meters.

The briquette throughput rate is about 4,000 kg of carbonized briquettes per hour and oven. This amounts to about 100 tons per 24 hours and oven, which is more than twice the throughput capacity of a conventional chamber coke oven.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
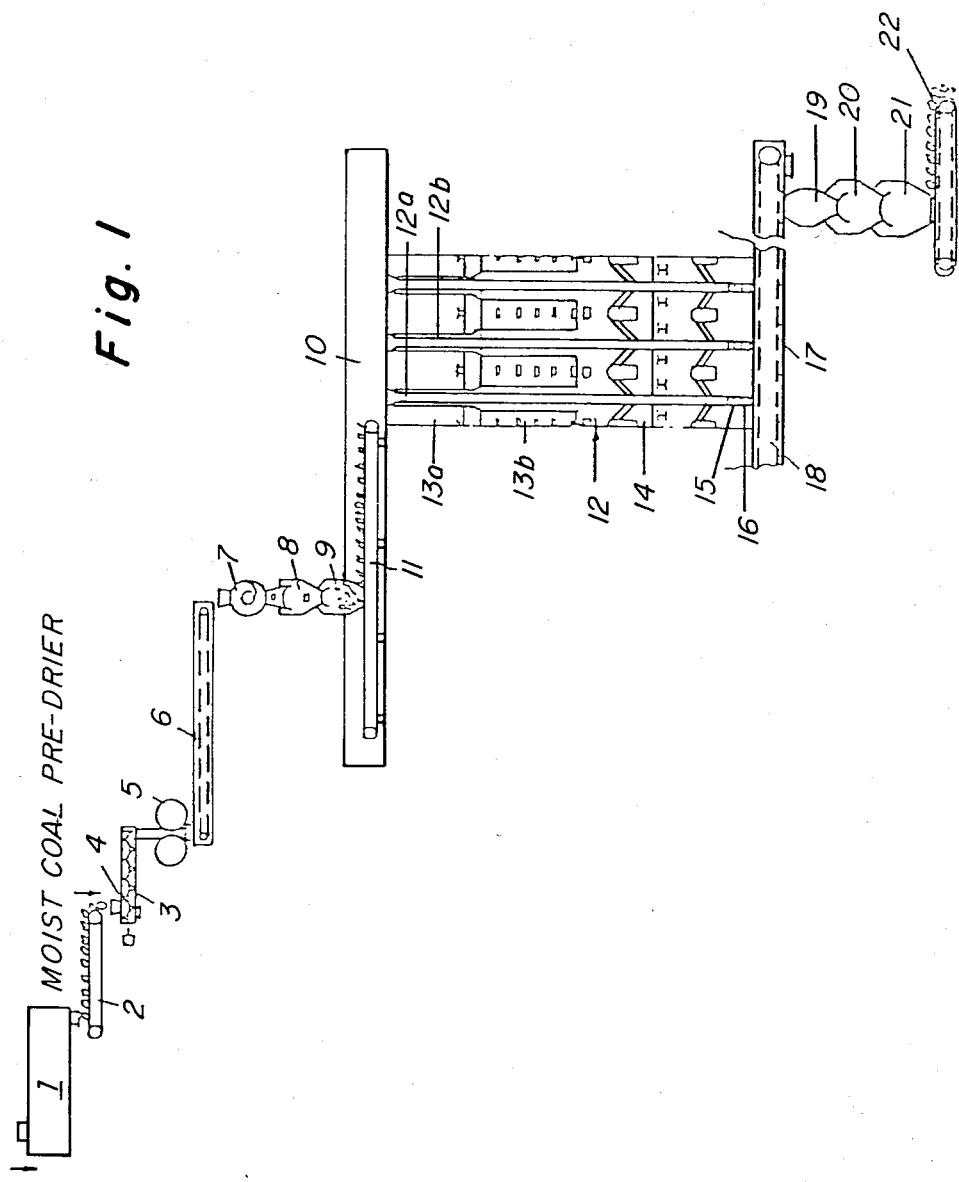
FIG. 1 is a diagrammatical illustration of the method, and the apparatus used therefor.

In accordance with the invention, coal is cold-compacted into briquettes of bituminous and sub-bituminous coal and/or peat along with a binder such as a sulfite liquor or a mixture of a sulfite liquor and a tar or pitch or other mineral residue. Coal is predried in a predryer 1 and delivered over a cooling belt 2 to a hopper 4 in which the binder is added in a mixer 3. The mixture is then roll-pressed by a compactor 5 delivered to a preheater 6. The briquettes which are preheated and hardened in continuously operating preheater 6 are then delivered to a distributor 7, through a lock 8 and feed hopper 9 to a reversible belt 11 which acts as a distributing unit and is advanced selectively in a housing 10 to align with a specific shaft of a bank of vertically elongated horizontally arranged shaft ovens 12. In accordance with the invention, the shaft oven (FIG. 2) is designed with respect to the rich gas supply duct 25 and air supply slots 28 for burners such that a high temperature part 13b bounded by ceramic material is defined intermediate its height and a low temperature part 13a bounded by metal is disposed above this area adjacent the upper end of the coke oven.

FIG. 1 shows predrier 1 for moist coal and cooling belt 2 for the coal heated up in the predrying process. In mixer 3, designed as a conveyor screw, the coal is mixed with the binder. The binder is added through hopper 4. The coal mixture is then compacted in roll press compactor 5, 6 being the equipment for preheating and subsequent hardening. The briquettes then pass through distributor 7, lock 8, and feed hopper 9 to reversible belt 11, which is enclosed in housing 10.

Each shaft oven 12 (FIG. 2) has upper portion 13a (low-temperature coking portion) of metal, and a high-temperature portion 13b of a ceramic material. Further shown are a cooling stage 14 and a briquette feeder 15 for chain conveyors 16 which are provided below each shaft oven. The chain conveyor 18 for the coke briquettes is enclosed in a housing 17 extending along the coke oven battery (FIG. 1).

Figure 2:
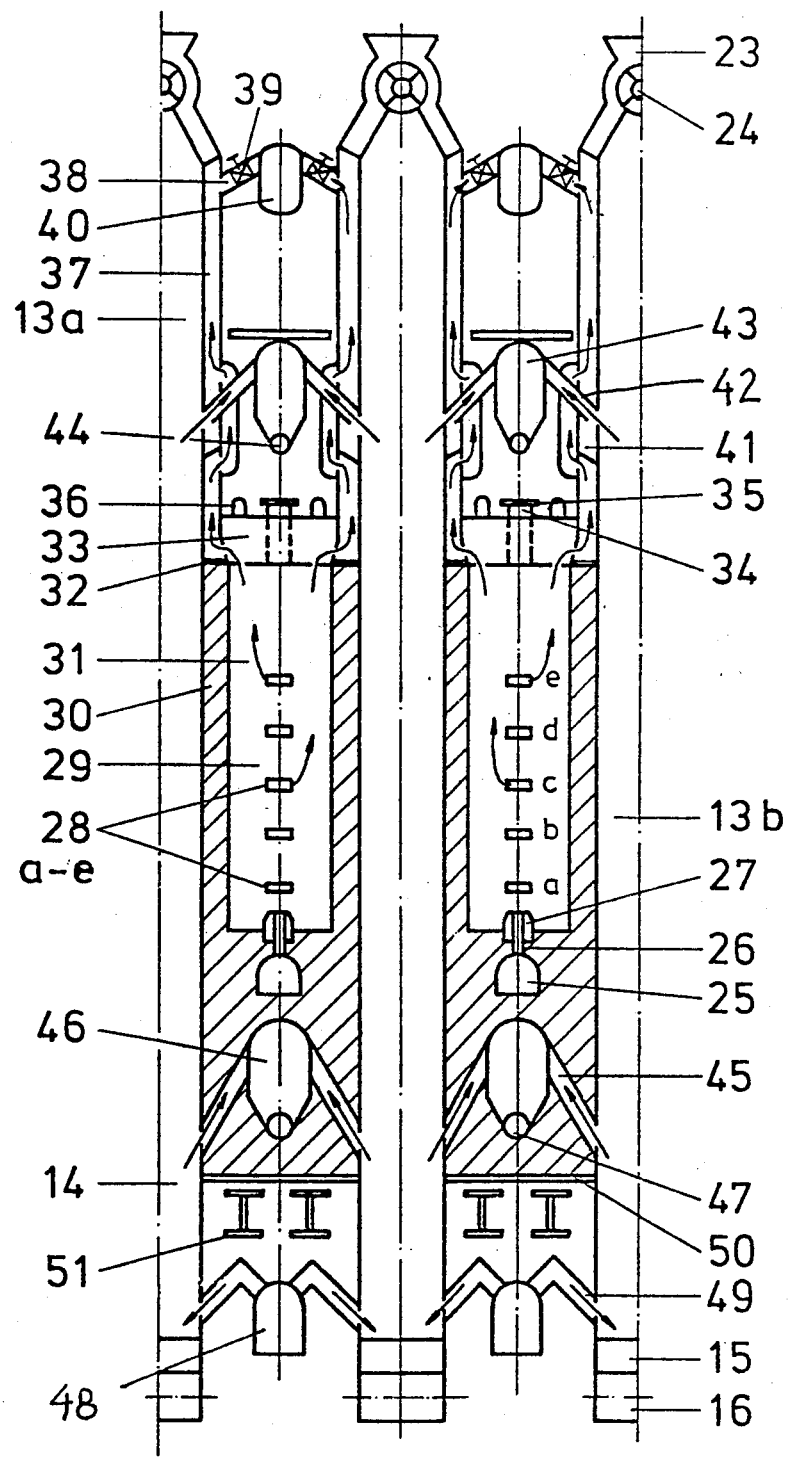
FIG. 2 is a diagrammatical longitudinal sectional view of the coking shaft shown in FIG. 1.

FIG. 2 shows the shaft oven 12 with hopper 23 for the briquettes having a star feeder 24. Rich gas duct 25 is provided for the heating of the high-temperature stage which is directed through supply passages 26 to the burner nozzles 27 of heating flue 29. Air supply is provided by slots 28a-e. Heating flues 29 are formed by stretcher walls 30 and binder walls 31 and there is a seal 32 between the high-temperature stage 13b and the low-temperature stage 13a. A flue gas collecting duct 33 has inspection ports 34 with flanges 35 and sight glasses and steel compensators 36. Flue gas ducts 37 and 38 are provided for heating the low-temperature stage and include flue gas control valves 39 and a flue gas collecting duct 40. Dust collecting pockets 41 are heated in the crude gas exhaust, and individual crude gas exhaust passages 42 with a crude gas collecting duct 43 and dust discharge screw 44 are provided for the crude gas. A dust discharge screw 44, and an exhaust 45 for the cooling gases are provided along with a collecting duct 46 for the heated up cooling gases, i.e. the cooling gases which have absorbed the heat of the incandescant coke. The construction includes a duct 48 for collecting the cool cooling gases, distribution passages 49 for the cool cooling gases, a supporting plate 50, and beams 51 for supporting the oven structure.

While specific embodiments of the invention have been shown and described in detail to illustrate the application of the principles of the invention, it will be understood that the invention may be embodied otherwise without departing from such principles.

What is claimed is:

1. An apparatus for carbonizing coal briquettes, comprising a coking shaft oven having a plurality of vertically elongated horizontally arranged coking shafts, a belt-type preheater arranged over said coking shafts and operable at a speed of about 80 to 150 mm per minute, delivery means for delivering briquettes of coal and sulfite liquor to said preheater, distribution means located between said preheater and said coking shaft oven for distributing preheated briquettes into the coking shafts, said coking shaft oven including a first stage made of metal and extending about one-half the height of said coking shaft around a top portion of said shafts and operating at a medium temperature, a second stage made of ceramic material and extending around intermediate portions of said shaft and operating at a higher temperature, and a cooling stage below said second stage and surrounding lower portions of said shafts, cooling gas means in said cooling stage for supplying cool cooling gas to a bottom of each coking shaft and for withdrawing hot cooling gases from a location in said coking shafts corresponding to a top of said cooling stage and a bottom of said second stage, said second stage including stretcher walls made of ceramic material and bounded on one side by adjacent coking shafts and defining a heating flue on an opposite said thereof, said second stage including air supply means for supplying air to each heating flue and rich gas supply means for supplying rich gas to a bottom of each heating flue for combustion in each heating flue between said stretcher walls, said first stage including outer metal walls bound said coking shafts and flue gas passage means defined on sides of said metal walls opposite from said coking shafts, said flue gas passage means connected to said heating flues for the passage of flue gas from said heating flues to heat the top portion of said coking shafts at the medium temperature, flue gas control valve means connected to said flue gas passage means at a top of said first stage for controlling the passage of flue gas and thus controlling the medium and higher temperatures, and crude gas discharge means in said first stage communicating with said coking shafts for discharging crude gas from said coking shafts.

2. An apparatus according to claim 1, wherein said first stage has an overall height of from 4 to 7 meters and wherein said second stage has an overall height of from 3 to 5 meters.

* * * * *